United States Patent
Sugahara

[11] Patent Number: 5,925,851
[45] Date of Patent: Jul. 20, 1999

[54] LEAD WIRE GUIDING STRUCTURE

[75] Inventor: Yasushi Sugahara, Toyohashi, Japan

[73] Assignee: ASMO Co., Ltd., Kosai, Japan

[21] Appl. No.: 08/876,049

[22] Filed: Jun. 13, 1997

[30] Foreign Application Priority Data

Oct. 28, 1996 [JP] Japan .................................. 8-302539

[51] Int. Cl.⁶ .................................................. H02G 3/18
[52] U.S. Cl. ............... 174/65 G; 174/65 R; 174/152 G; 174/153 G
[58] Field of Search ............................... 174/65 R, 17 CT, 174/65 G, 50, 66, 67, 151, 135, 152 G, 153 G; 220/3.8, 241, 242; 248/56; 16/2.1, 2.2

[56] References Cited

U.S. PATENT DOCUMENTS

| | | | |
|---|---|---|---|
| 1,741,823 | 12/1929 | Burg | 174/66 X |
| 2,845,198 | 7/1958 | Feiertag | 220/3.8 |
| 3,499,097 | 3/1970 | Widstrand | 174/65 G |
| 3,809,798 | 5/1974 | Simon | 174/65 R X |
| 4,178,057 | 12/1979 | McCormick | 174/65 R X |
| 4,342,946 | 8/1982 | Valenzona et al. | 315/82 |
| 4,430,520 | 2/1984 | Tibbetts et al. | 174/65 R X |
| 4,449,015 | 5/1984 | Hotchkiss et al. | 174/65 R X |
| 4,654,470 | 3/1987 | Feldman et al. | 174/65 R X |
| 4,724,281 | 2/1988 | Nix et al. | 174/65 R X |
| 5,239,133 | 8/1993 | Beck et al. | 174/65 R |
| 5,347,088 | 9/1994 | Marsh et al. | 174/50 |
| 5,693,908 | 12/1997 | Amberger | 174/65 R X |

FOREIGN PATENT DOCUMENTS

| | | | |
|---|---|---|---|
| 55-37266 | 9/1953 | Japan . | |
| 63-17547 | 2/1988 | Japan . | |
| 2-53251 | 4/1990 | Japan . | |
| 8-37055 | 2/1996 | Japan . | |
| 608275 | 9/1948 | United Kingdom | 174/65 R X |

*Primary Examiner*—Dean A. Reichard
*Attorney, Agent, or Firm*—Burns, Doane, Swecker & Mathis, L.L.P.

[57] ABSTRACT

In a lead wire guiding structure applied to a motor actuator, a case member holding lead wires, electric connecting portions and the like has a through hole from which the lead wires protrude, and a notch. Further, a cover for covering the case member has a guide wall. The guide wall forms an opening along with the notch of the case member, and simultaneously bends the lead wires protruding from the through hole so that the lead wires are received in the notch of the cover. Accordingly, the lead wires can protrude outside through the opening in a required direction.

23 Claims, 7 Drawing Sheets

LEAD WIRE GUIDING STRUCTURE

CROSS REFERENCE TO RELATED APPLICATION

This application is based upon and claims the benefit of priority of the prior Japanese Patent Application No. 8-302539 filed on Oct. 28, 1996, the contents of which are incorporated herein by reference.

BACKGROUND OF THE INVENTION

1. Field of the Invention

The present invention relates to a lead wire guiding structure capable of protruding lead wires in a required direction.

2. Related Arts

It is well-known that a dynamo-electric machine such as a motor or the like has a case for holding various electrical components, a terminal plate, and the like, and a cover for covering the case. The terminal plate is electrically connected to the outside of the dynamo-electric machine through lead wires. The lead wires extend from the terminal plate to the outside via through holes or notches, which are formed on the case or on the cover.

Conventionally, the lead wires directly protrude outside from the case or from the cover in parallel with a connecting direction thereof with the terminal plate, and if necessary, they are bent at the outside of the dynamo-electric machine. That is, the protruding direction of the lead wires to the outside is determined by the connecting direction thereof with the terminal plate. Therefore, it is difficult to protrude the lead wires outside in a required direction. For example, to prevent water from invading the case, it is desired that the lead wires protrude downward. However, in certain cases, the lead wires cannot be connected to the terminal plate to elongate downward. In addition, in a case where the lead wires need to be lengthened in order to be guided in a required direction, it is necessary to prevent the drift of the lead wires.

SUMMARY OF THE INVENTION

The present invention has been made in view of the above-mentioned problems and an object of the present invention is to provide a lead wire guiding structure capable of protruding lead wires outside in a required direction.

In a lead wire guiding structure according to the present invention, a case holding a lead wire has a through hole and a notch formed adjacent to the through hole. The lead wire is electrically connected to an electrical connecting portion in the case, and protrudes via the through hole from the case. Further, the case is covered with a cover having a guide wall. The guide wall forms an opening with the notch of the case, and bends the lead wire so that the lead wire is received in the notch of the case to protrude outside from the opening.

According to the present invention, by the guide wall of the cover, the lead wire can be easily received in the notch of the case to protrude outside from the opening. Further, the protruding direction of the lead wire to the outside is determined by the guide wall and the notch. Therefore, regardless of the direction in which the leading wire extends from the electrical connecting portion in the case, the lead wire can be easily guided in a required direction.

Preferably, the opening opens downward. Accordingly, water is less susceptible to invade the case through the opening. The guide wall may be a side wall of the cover. In this case, it is not necessary to form an extra wall as the guide wall. Further, it is desired that a height of the guide wall is higher than that of the other parts of the side wall of the cover.

More preferably, the through hole is formed in a grommet, and the grommet is hermetically installed in the case. In this case, the lead wire protrudes from the case via the through hole formed in the grommet. As a result, a water proof effect of the lead wire guiding structure can be enhanced more.

BRIEF DESCRIPTION OF THE DRAWINGS

Other objects and features of the present invention will become more readily apparent from a better understanding of the preferred embodiment described below with reference to the following drawings.

DETAILED DESCRIPTION OF THE PREFERRED EMBODIMENT

An embodiment according to the present invention will be described hereinunder with reference to the drawings. The embodiment of the present invention is applied to a motor actuator shown in FIG. 1 for driving automotive wipers. The motor actuator has a motor 10 and a speed changing section 12. A torque of a rotation shaft (not shown) of the motor 10 is conveyed to an output shaft (not shown) through a speed change gear (not shown) in the speed changing section 12. The speed changing section 12 has a gear cover 14 for covering the speed change gear.

Figure 1:
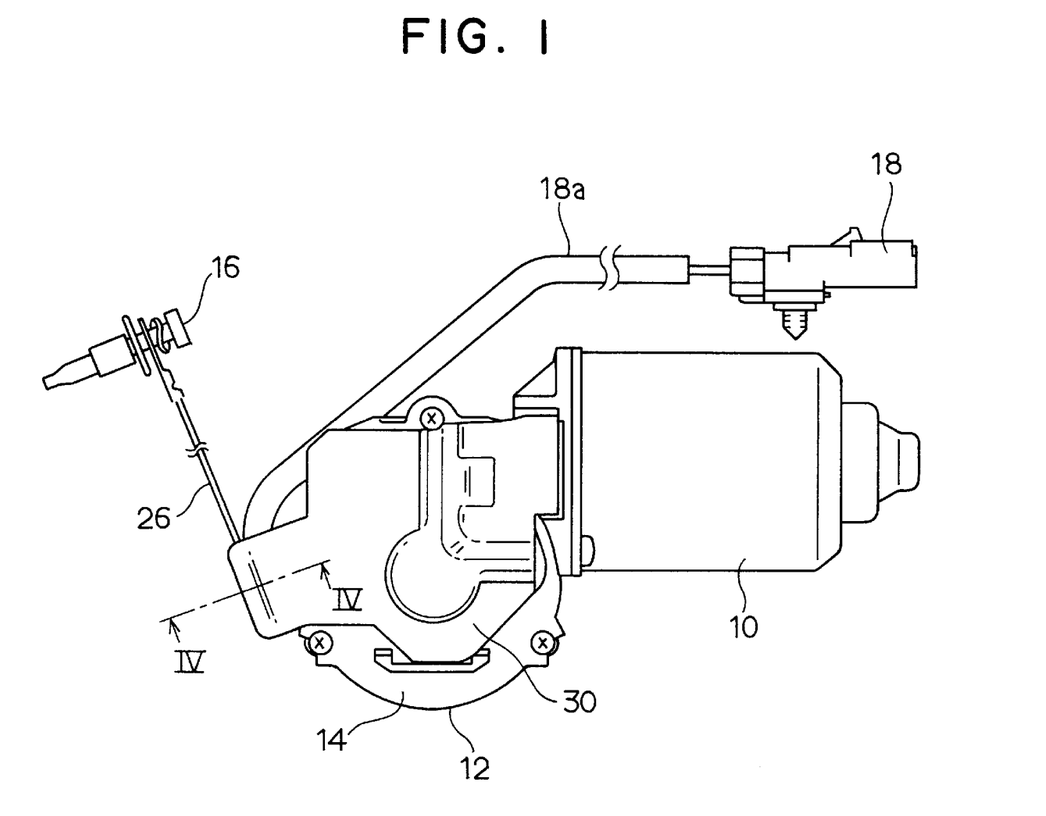
FIG. 1 is a schematic view showing a motor actuator in an embodiment according to the present invention.
Figure 2:
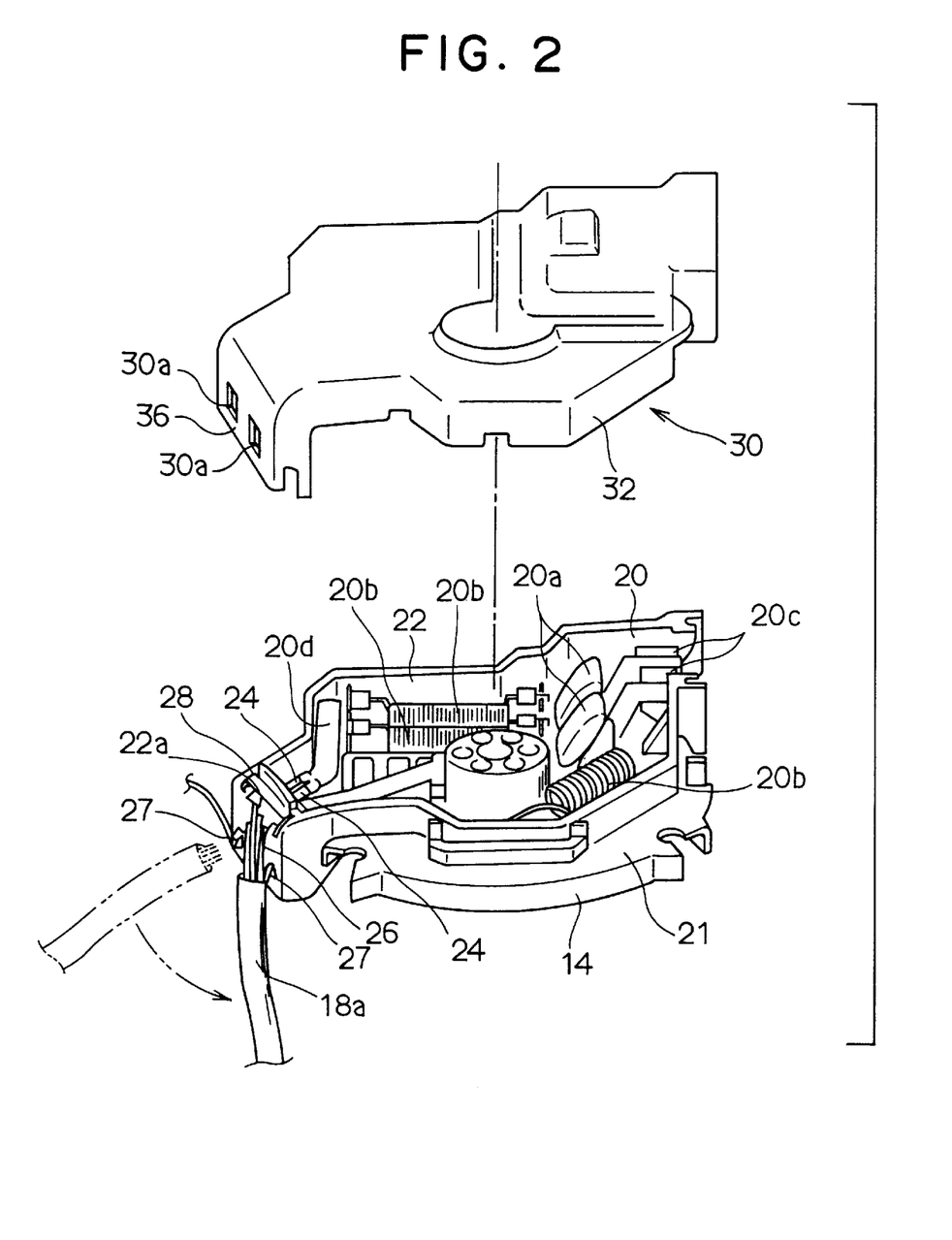
FIG. 2 is a perspective view showing a case member and a cover for covering the case member in the motor actuator.

As shown in FIG. 2, the gear cover 14 has a case member 20 which is covered by a cover 30. The case member 20 is divided by a partition wall 22 to have a holding area for holding electrical components, terminal plates 20c, a connecting plate 20d, and the like. The electrical components include capacitors 20a, coils 20b, and the like. The partition wall 22 is formed on a base member 21 of the case member 20. Here, lead wires 26 are connected to connecting portions 24 of the connecting plate 20d in parallel with the direction in which the connecting plate 20d extends. As shown in FIG. 1, one of the lead wires 26 is connected to a bolt 16 to be grounded, and the others are inserted into a tube 18a to be bundled and are connected to a connector 18.

Figure 3:
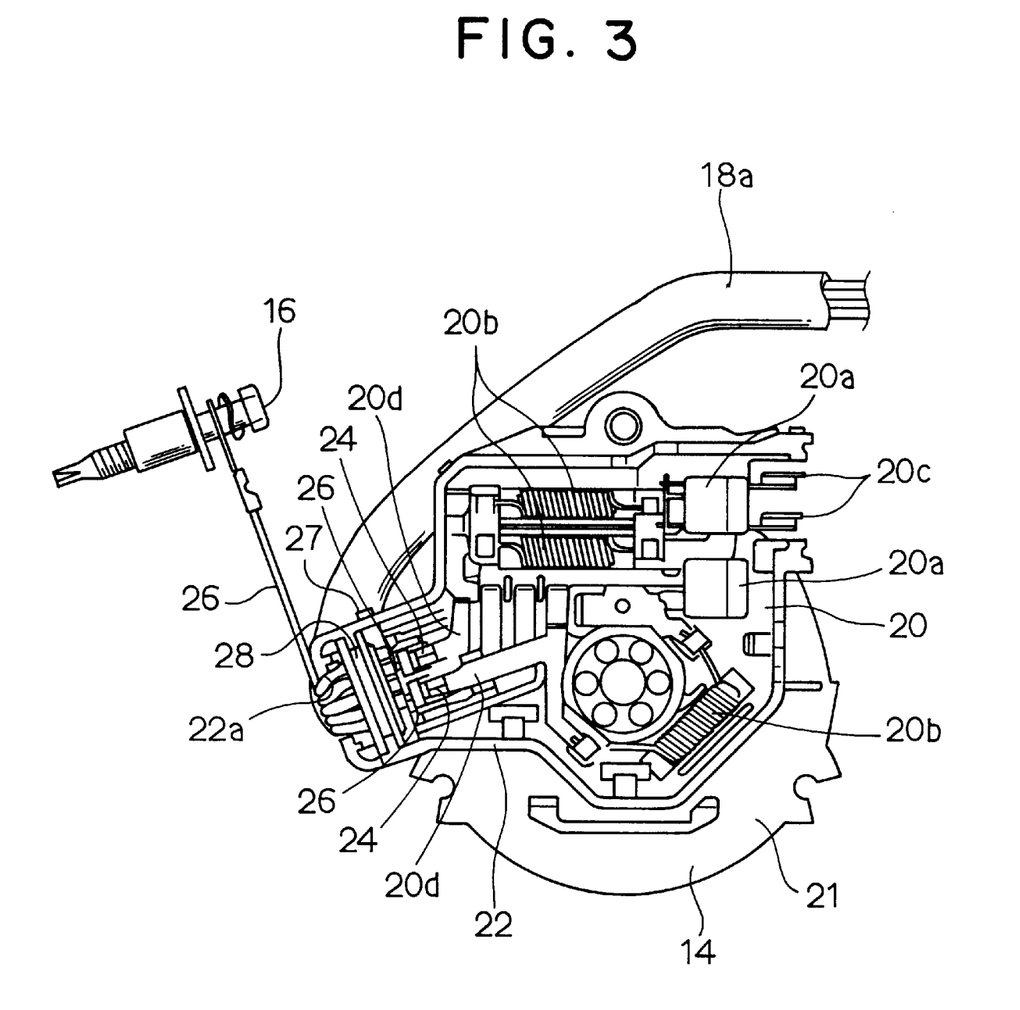
FIG. 3 is a plan view showing the case member.
Figure 4A:
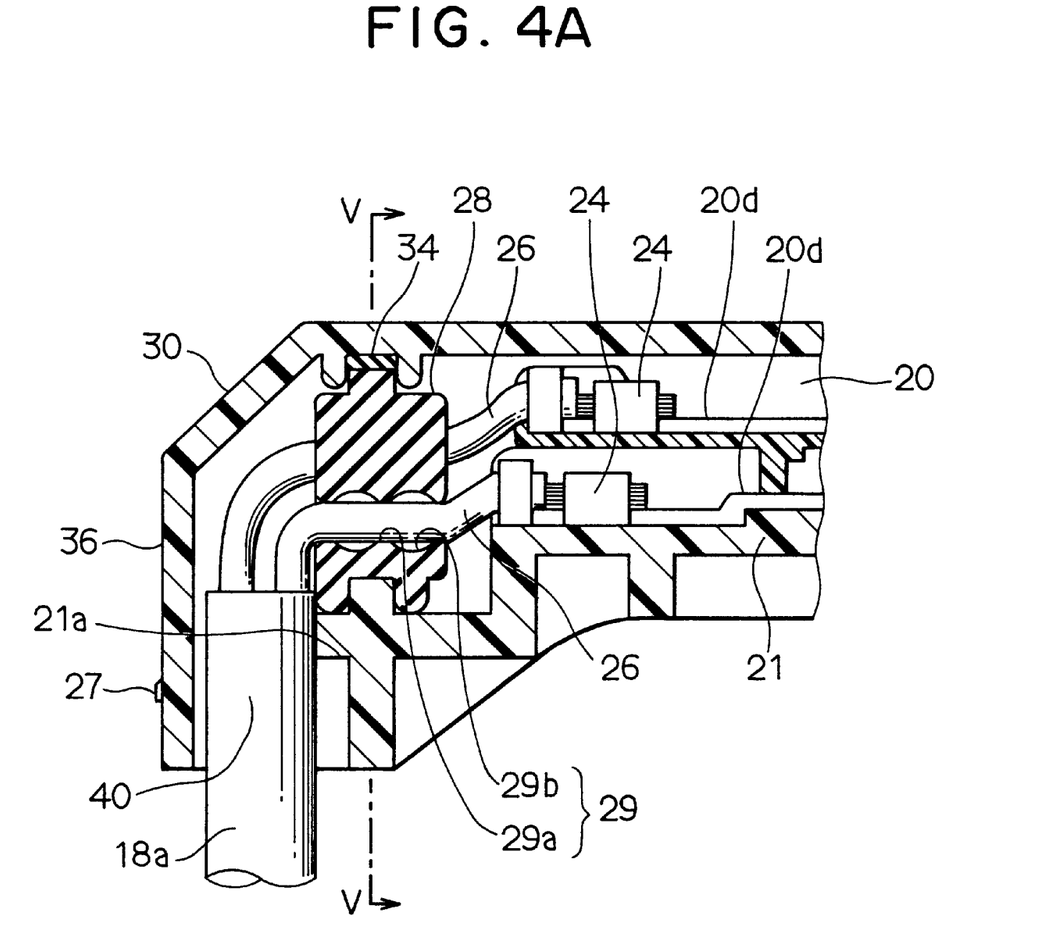
FIG. 4A is a cross-sectional view taken along a IV—IV line in FIG. 1, showing a state where the cover is attached to the case member.
Figure 5:
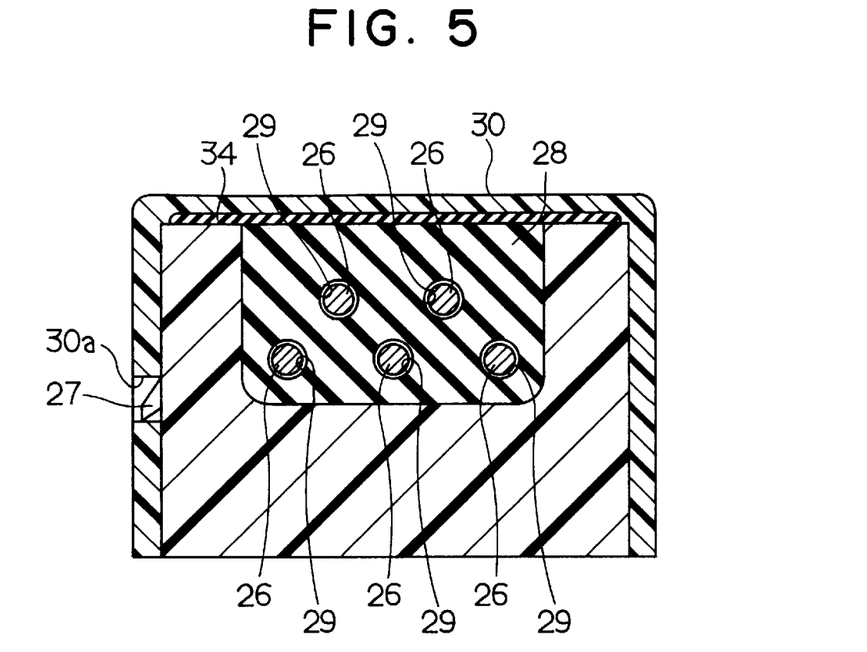
FIG. 5 is a cross-sectional view taken along a V—V line in FIG. 4A, showing a grommet and through holes formed in the grommet of the motor actuator.

In the case member 20, as shown in FIGS. 3 and 4, a grommet 28 having through holes 29 is hermetically installed, and the lead wires 26 are inserted into the through holes 29. The through holes 29 shown in FIG. 4A has small diameter portions 29a and large diameter portions 29b so that the lead wires 26 closely contact the inside surfaces of the small diameter portions 29a of the through holes 29 when inserted. Further, as shown in FIG. 5, the through holes 29 are arranged with two lines in the grommet 28, thereby miniaturizing the grommet 28 compared to the case where the through holes 29 are arranged with one line.

As shown in FIGS. 2 and 3, the partition wall 22 has a notch 22a at the outside of the grommet 28 not to inhibit the lead wires 26 from extending from the connecting portions 24. Further, as shown in FIG. 4A, the base member 21 of the case member 20 has a notch 21a opening in a right-angled direction relative to the connecting plate 20d mounted on the base member 21. Therefore, the lead wires 26 extend directly (in the left direction in FIG. 4A) from the connecting portions 24, and then, are bent by the cover 30 at right angles (in the lower direction in FIG. 4A) to protrude outside of the motor actuator through the notch 21a.

The partition wall 22 of the case member 20 has several projections 27. When the case member 20 is covered with the cover 30, as shown in FIGS. 2 and 5, the projections 27 are engaged with engaging through holes 30a of the cover 30, so that the cover 30 is less susceptible to be detached from the case member 20.

Figure 6:
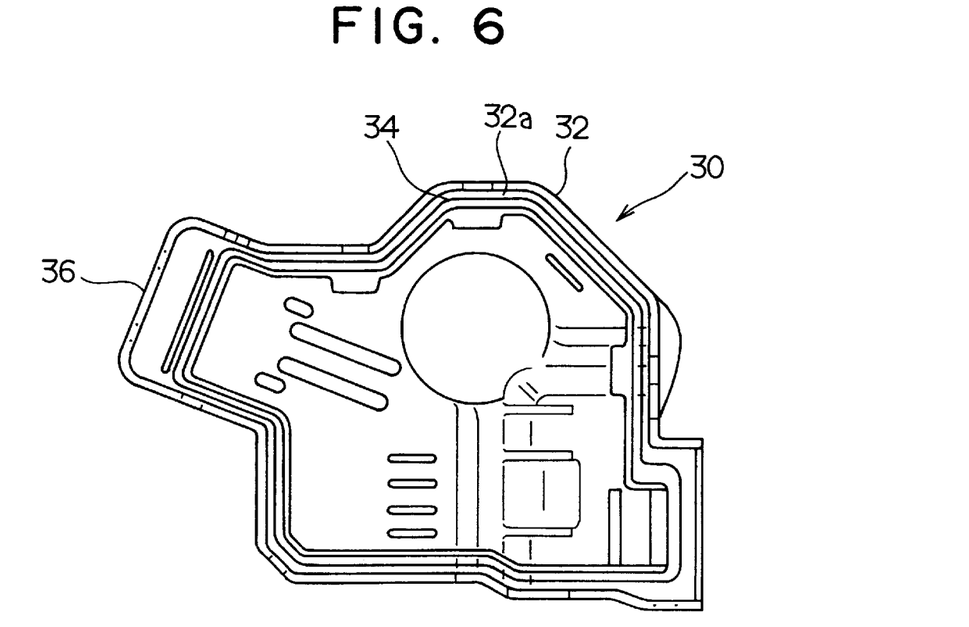
FIG. 6 is a plan view showing an inside face of the cover.

Next, the structure of the cover 30 will be described in more detail. As shown in FIG. 2, the cover 30 has a side wall 32 formed along the outer circumferential face of the partition wall 22 of the case member 20. FIG. 6 shows the inside face of the cover 30. The cover 30 has a groove 32a at the inside of the side wall 32, and coated on the groove 32a is butyl rubber 34. The butyl rubber 34 closely contacts the upper end of the partition wall 22 and the upper end of the grommet 28 so as to function as a sealing member, thereby keeping airtightness between the case member 20 and the cover 30.

The side wall 32 includes a guide wall 36 higher than the other parts of the side wall 32 as shown in FIG. 2. The guide wall 36 is provided to face the notch 22a of the partition wall 22 when the cover 30 is attached to the case member 20. By this guide wall 36, the lead wires 26 are bent at right angles relative to the direction in which the lead wires 26 extend from the connecting portions 24. Accordingly, the lead wires 26 are led to the outside of the motor actuator through the notch 21a (refer to FIG. 4A) of the case member 20.

Figure 4B:
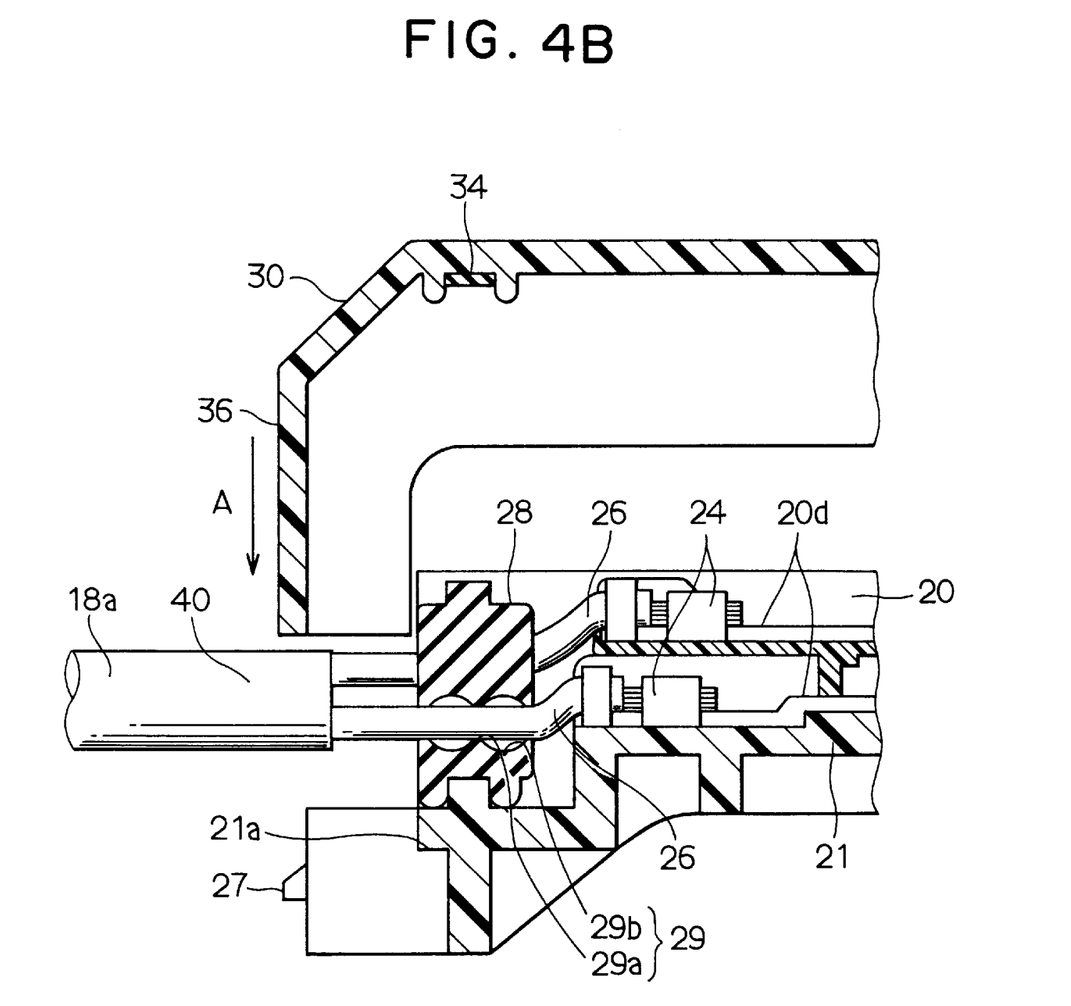
FIGS. 4B and 4C are cross-sectional views for explaining a process of attaching the cover to the case member.
Figure 4C:
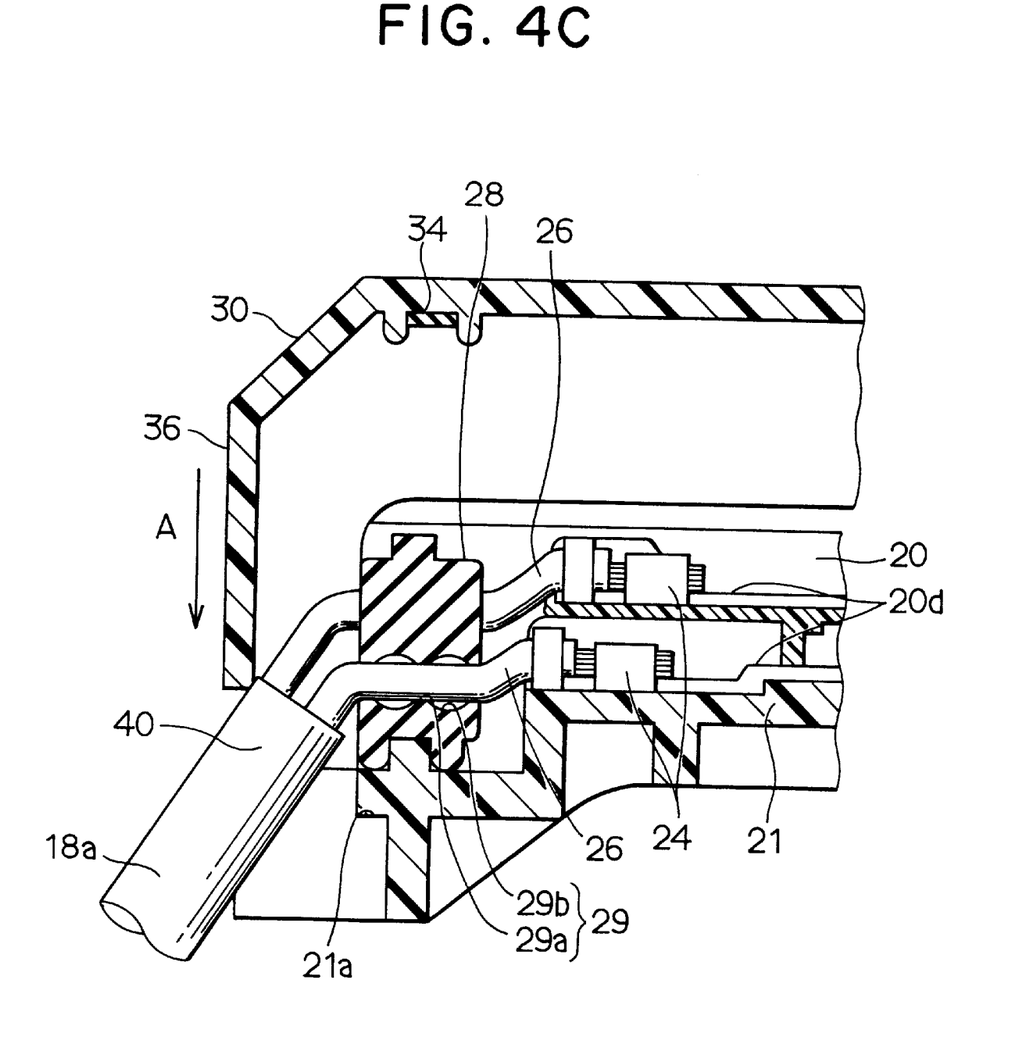

Next, a method of forming the above-mentioned structure will be explained below. Firstly, various electrical components, the connecting plate 20d and the like are mounted on the case member 20. This process can be performed only by fitting the electrical components, the connecting plate 20d and the like to engaging projections or engaging through holes (not shown) formed on the case member 20. End portions of the lead wires 26 are inserted into the through holes 29 of the grommet 28, and the other end portions of the lead wires 26 are fixed to the connecting portions 24 of the connecting plate 20d by pressing. Next, the grommet 28 is installed in the case member 20. In this state, the lead wires 26 directly elongate from the connecting portions 24 as indicated by two-dot chain lines in FIG. 2 to be led to the outside through the notch 22a of the case member 20. Thereafter, as shown in FIGS. 4B and 4C, the cover 30 is attached to the case member 20 so that the guide wall 36 presses down and bends the lead wires 26 in the right-angled direction relative to the connecting plate 20d (in the direction indicated by an arrow A in FIGS. 4B and 4C), so that the lead wires 26 are received in the notch 21a of the case member 20. Thus, the lead wires 26 protrude outside of the motor actuator through an opening 40 formed by the notch 21a of the case member 20 and the guide wall 36 of the cover 30.

According to the present invention, the lead wires 26 are bent by the guide wall 36 to be received in the notch 21a, and protrude to the outside through the opening 40. That is, the protruding direction of the lead wires 26 is determined by the guide wall 36 and the notch 21a. In particular, when the motor actuator is installed in a vehicle so that the opening 40 opens downward, water is less susceptible to invade the motor actuator through the opening 40. Even if water invades the motor actuator through the opening 40 by splashing, spattering, or the like, the butyl rubber 34 and the grommet 28 prevent the motor actuator from being flooded. In addition, the protruding direction of the lead wires 26 is perpendicular to the direction in which lead wires 26 are penetrating the grommet 28. Therefore, even if the lead wires 26 are pulled, load is not directly applied to the connecting portions 24, thereby preventing detachment of the lead wires 26.

While the present invention has been shown and described with reference to the foregoing preferred embodiment, it will be apparent to those skilled in the art that changes in form and detail may be made therein without departing from the scope of the invention as defined in the appended claims. For example, it is not always necessary that the opening 40 opens downward, and the opening direction of the opening 40 can be changed if necessary. It should be noted that the angle of the lead wires 26 bent by the guide wall 36 can be changed in accordance with the required direction in which the lead wires 26 is to be guided.

Variations such as those described above are to be understood as being within the scope of the present invention as defined by the appended claims.

What is claimed is:

1. A method of guiding a lead wire from a case having an opening portion and a side wall having a through hole, the method comprising:
    taking the lead wire out, via the through hole, from an inside of the case to an outside of the case;
    preparing a cover having a cover main wall for covering the opening portion of the case, and a guide wall;
    coating a sealing material on at least one of an inside part of the cover main wall and an open end part of the side wall on a side of the opening portion, the inside part of the cover main wall and the open end part of the side wall contacting one another when the cover is attached to the case; and
    attaching the cover to the case while bending the lead wire with the guide wall so that the inside part of the cover main wall and the open end part of the side wall contact one another with the sealing material interposed therebetween.

2. A method of guiding a lead wire according to claim 1, wherein the lead wire is bent by the guide wall to be approximately parallel to the guide wall.

3. A method of guiding a lead wire according to claim 1, wherein the guide wall is a side wall of the cover.

4. A method of guiding a lead wire according to claim 1, wherein a height of the guide wall is higher than that of the side wall of the cover.

5. A method of guiding a lead wire according to claim 1, wherein
    the side wall has therein a grommet portion including the through hole, the grommet portion having an open end on the side of the opening portion; and
    the sealing material is coated on at least one of the inside part of the cover main wall and the open end of the grommet portion.

6. A method of guiding a lead wire according to claim 1, wherein the cover is attached to the case to form an opening with the side wall of the case so that the lead wire protrudes from the opening.

7. A method of guiding a lead wire according to claim 6, wherein the opening opens downward.

8. A lead wire guiding structure comprising:

a case having an opening portion and a side wall;

a grommet installed in the side wall, and having an open end on a side of the opening portion and a grommet through hole therein;

an electrical connecting portion held in the case;

a lead wire electrically connected to the electrical connecting portion and protruding from the case through the grommet through hole;

a cover for covering the opening portion of the case, the cover having a guide wall which bends the lead wire so that the lead wire extends between the guide wall and the side wall of the case in a direction opposite to the opening portion of the case; and a sealing member made of an elastic material and disposed between the open end of the grommet and the cover.

9. A lead wire guiding structure according to claim 8, wherein the lead wire extends downward between the guide wall of the cover and the side wall of the case.

10. A lead wire guiding structure according to claim 8, wherein the guide wall is a side wall of the cover.

11. A lead wire guiding structure according to claim 8, wherein the lead wire protruding from the grommet through hole is bent by the guide wall approximately at a right angle relative to a direction in which the lead wire elongates from the electrical connecting portion to the grommet through hole.

12. A lead wire guiding structure according to claim 8, wherein the lead wire protruding from the grommet through hole is bent by the guide wall to be approximately parallel to the guide wall.

13. A lead wire guiding structure according to claim 8, wherein the cover has a side wall and a height of the guide wall is higher than that of the side wall.

14. A lead wire guiding structure according to claim 8, wherein a notch is provided on the side wall of the case for receiving the lead wire extending between the side wall and the guide wall.

15. A lead wire guiding structure according the claim 8, wherein the grommet is made of an elastic material for elastically supporting the lead wire.

16. A method of guiding a lead wire from an inside of a case having an opening portion, comprising:

installing a grommet having a grommet through hole in a side wall of the case so that the grommet has an open end on a side of the opening portion and so that the lead wire protrudes from the inside of the case through the grommet through hole;

coating a sealing material on at least one of an inside portion of a cover and the open end of the grommet, the inside portion contacting the open end of the grommet when the cover is attached to the case; and attaching the cover which has a guide wall to the case so as to cover the opening portion of the case and so as to bend the lead wire protruding from the grommet through hole with the guide wall.

17. A method of guiding a lead wire according to claim 16, wherein the lead wire is bent by the guide wall to be approximately parallel to the guide wall.

18. A method of guiding a lead wire according to claim 16, wherein the guide wall is a side wall of the cover.

19. A method of guiding a lead wire according to claim 16, wherein a height of the guide wall is higher than that of the side wall.

20. A method of guiding a lead wire according to claim 16, wherein the sealing material is butyl rubber.

21. A method of guiding a lead wire according to claim 16, wherein the side wall of the case has a notch for receiving the lead wire which is bent by the guide wall.

22. A method of guiding a lead wire according to claim 21, wherein the cover is attached to the case so that the guide wall forms an opening with the notch so that the lead wire protrudes from the opening.

23. A method of guiding a lead wire according to claim 22, wherein the opening opens downward.

* * * * *